(12) United States Patent
Nosaka et al.

(10) Patent No.: US 8,660,400 B2
(45) Date of Patent: Feb. 25, 2014

(54) IMAGING APPARATUS AND METHOD OF STARTING THE SAME

(75) Inventors: Masafumi Nosaka, Osaka (JP); Hisataka Ueda, Osaka (JP); Daisuke Hayashi, Nara (JP); Kazumasa Kashiwagi, Nara (JP)

(73) Assignee: Panasonic Corporation, Osaka (JP)

( * ) Notice: Subject to any disclaimer, the term of this patent is extended or adjusted under 35 U.S.C. 154(b) by 900 days.

(21) Appl. No.: 12/485,442

(22) Filed: Jun. 16, 2009

(65) Prior Publication Data

US 2010/0003017 A1   Jan. 7, 2010

(30) Foreign Application Priority Data

Jun. 17, 2008   (JP) .................................. 2008-157737

(51) Int. Cl.
  *H04N 5/77*   (2006.01)
(52) U.S. Cl.
  USPC .......................................... 386/224; 386/230
(58) Field of Classification Search
  USPC ................................................ 386/224, 230
  See application file for complete search history.

(56) References Cited

U.S. PATENT DOCUMENTS

| | | | | |
|---|---|---|---|---|
| 5,751,509 | A * | 5/1998 | Ogasawara et al. | 360/70 |
| 6,556,774 | B2 * | 4/2003 | Tsumagari et al. | 386/241 |
| 6,577,811 | B1 * | 6/2003 | Kikuchi et al. | 386/246 |
| 2001/0012064 | A1 | 8/2001 | Kubo | |
| 2002/0172496 | A1 * | 11/2002 | Gunji et al. | 386/46 |
| 2008/0222314 | A1 * | 9/2008 | Matsushita et al. | 710/13 |
| 2009/0290044 | A1 | 11/2009 | Yoshino et al. | |
| 2010/0005227 | A1 | 1/2010 | Nakanishi et al. | |
| 2010/0010972 | A1 * | 1/2010 | Higashiyama | 707/3 |
| 2010/0091136 | A1 * | 4/2010 | Nakase et al. | 348/231.2 |

FOREIGN PATENT DOCUMENTS

| | | |
|---|---|---|
| JP | 2001-036785 A | 2/2001 |
| JP | 2001-177793 | 6/2001 |
| JP | 2002-237977 A | 8/2002 |
| JP | 2003-259277 | 9/2003 |
| JP | 2006-107173 | 4/2006 |
| JP | 2008-066894 | 3/2008 |
| JP | 2003-274224 | 9/2009 |
| WO | 2008/016081 | 2/2008 |

* cited by examiner

*Primary Examiner* — Thai Tran
*Assistant Examiner* — Jose Mesa
(74) *Attorney, Agent, or Firm* — Hamre, Schumann, Mueller & Larson, P.C.

(57) ABSTRACT

When a power source 22 is turned on, recording management information is obtained from a recording medium 70 and the obtained recording management information is analyzed. Whether or not recording of new image data on the recording medium 70 is possible is determined, based on the analysis result. If it is determined that recording the new image data on the recording medium 70 is possible, reception of recording start input that allows the image generation unit and the media management section respectively to generate and record the new image data generation of the new image data by an image generation unit 104 and recording of the new image data on the recording medium 70 is permitted.

18 Claims, 10 Drawing Sheets

IMAGING APPARATUS AND METHOD OF STARTING THE SAME

BACKGROUND OF THE INVENTION

1. Field of the Invention

The present invention relates to an imaging apparatus and a method of starting the same.

2. Description of Related Art

There has been a demand for a reduction of the time from power-on to a ready-to-record state in imaging apparatuses such as digital cameras and digital video cameras so that a user would not miss recording desired scenes. It takes a comparatively long time (e.g. 5 to 6 seconds) from power-on to the ready-to-record state because of the need for checking the recording medium, such as a memory card. Specifically, presence or absence of free space, reproducible image data or the like is checked.

JP 2001-36785 A and JP 2002-237977 A disclose techniques for reducing the time necessary from power-on to the ready-to-record state (hereinafter, also referred to as "the start time"), for example.

JP 2001-36785 A discloses an information processing apparatus in which, if replacement of recording medium is recognized during power-off, necessary information is obtained from the recording medium even during power-off, and the obtained information is saved in a backup memory. In this case, the start time can be reduced by making use of the information saved in the backup memory at the time of the next power-on.

A technique employed for the electronic camera disclosed in JP 2002-237977 A is basically the same as the technique disclosed in JP 2001-36785 A. That is, according to the electronic camera of JP 2002-237977 A, management information on free space or the like is read out from recording medium in advance, and then saved in a memory. At the time of power-on, whether or not shooting is possible is determined, based on the management information saved in the memory. If replacement of a battery or recording medium is recognized, management information is read out from the recording medium again, and then saved in the memory.

However, the techniques disclosed in the above patent documents require that replacement of recording medium be recognized even during power-off. Because of this, a recognition means for recognizing replacement of recording medium during power-off and continuous power supply to the recognition means are indispensable. For imaging apparatuses that operate by a battery, an increase of standby power is not preferable because it directly leads to reduction of recordation/reproduction time.

SUMMARY OF THE INVENTION

The present invention provides an imaging apparatus including: a power source that supplies power to the apparatus; an image generation unit that generates new image data based on a subject image; a media management section that serves to record the new image data on a recording medium and to read out existing image data stored in the recording medium; and a management information analysis section having functions of separately obtaining, from the recording medium, recording management information that is necessary for recording the new image data on the recording medium and reproduction management information that is necessary for reproducing the existing image data and analyzing each information. The management information analysis section is configured to determine, based on the analysis result of the recording management information, whether or not to permit reception of recording start input that allows the image generation unit and the media management section respectively to generate the new image data and record the new image data on the recording medium, when the power source is turned on, regardless of whether or not analysis of the reproduction management information is completed, at the time of completion of analysis of the recording management information.

According to another aspect of the present invention, there is provided a method for starting an imaging apparatus having a configuration in which recording of new image data on recording medium or reproduction of the existing image data on the recording medium is permitted based on that recording management information that is necessary for recording the new image data on the recording medium and reproduction management information that is necessary for reproducing the existing image data from the recording medium are obtained and analyzed separately. The method includes the steps of: determining, based on the analysis result of the recording management information, whether or not recording of the new image data on the recording medium is possible, when a power source of the imaging apparatus is turned on, regardless of whether or not analysis of the reproduction management information is completed, at the time of completion of analysis of the recording management information; and permitting reception of recording start input that allows an image generation unit and the media management section respectively to generate the new image data and record the new image data on the recording medium in the imaging apparatus, if it is determined that recording the new image data on the recording medium is possible.

Generally, analysis of recording management information is necessary for recording new image data on recording medium and analysis of reproduction management information is necessary for reproducing existing image data. In the present invention described above, in response to power-on, analysis of recording management information is performed. Then, if it is determined that recording new image data on recording medium is possible based on analysis of recording management information, reception of recording start input is permitted. By omitting or deferring analysis of reproduction management information, it becomes possible to reduce the time necessary from power-on by a user to a state where actual shooting or recording is possible (the start time).

DETAILED DESCRIPTION OF THE INVENTION

Hereinafter, embodiments of the present invention are described with reference to the attached drawings.

1. Configuration

Figure 1:
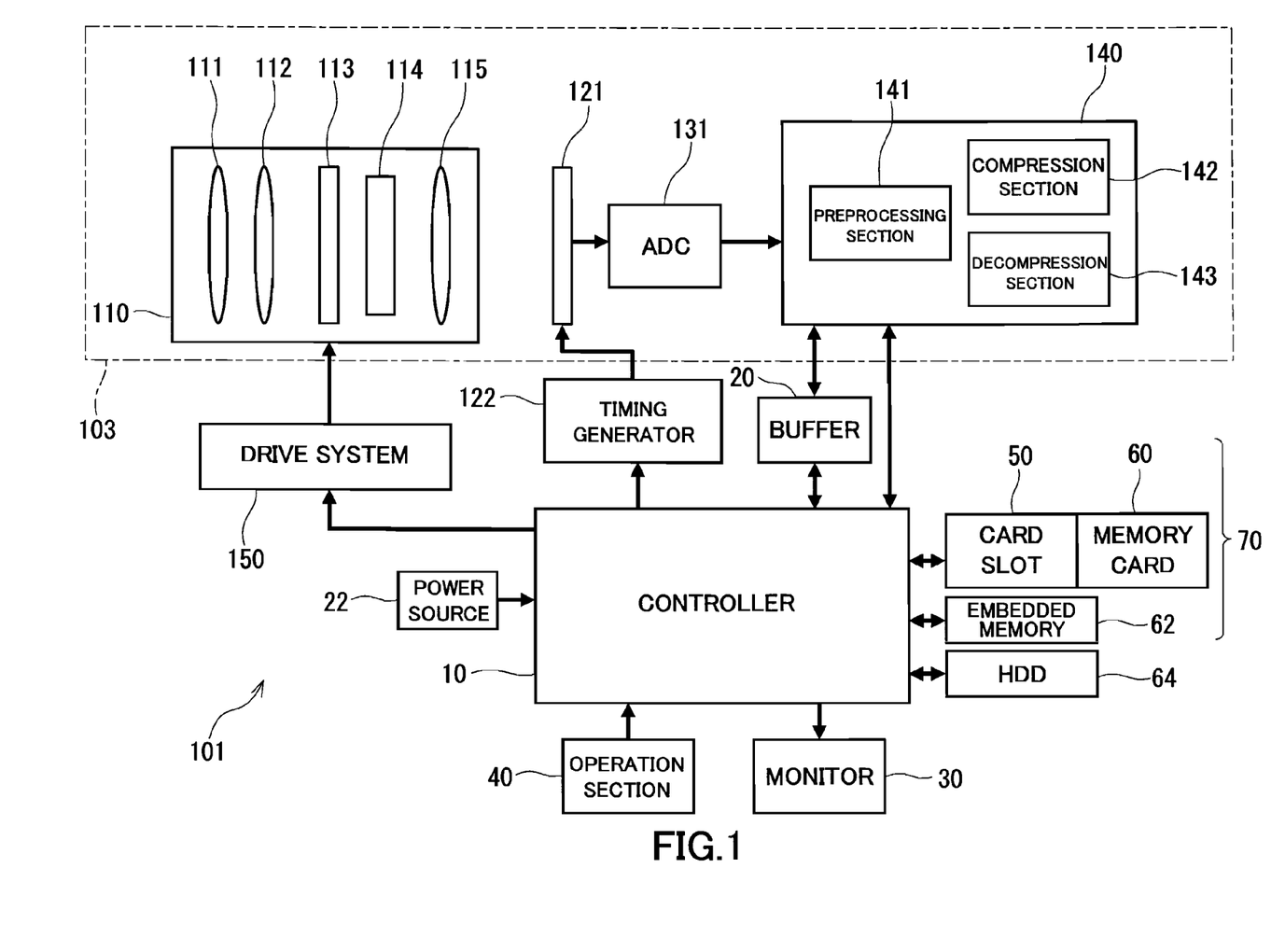
FIG. 1 is a block diagram of a video camera as an embodiment of an imaging apparatus according to the present invention.

FIG. 1 is a block diagram of a video camera as an embodiment of the imaging apparatus of the present invention. A video camera 101 is provided with an image generation unit 103, a controller 10, a card slot 50 and a monitor 30. An operation section 40 for various input operations is connected to the controller 10. A drive system 150, a timing generator 122 and a buffer 20 are provided, as peripheral devices, between the controller 10 and the image generation unit 103. Power is supplied to various sections of the video camera 101 from a power source 22, such as a battery and an AC power supply.

The image generation unit 103 includes an optical system 110, an image pickup element 121, an A/D converter 131 and an image processing section 140. While picking up a subject image, the image generation unit 103 generates new image data based on the subject image. New image data can be recorded in a recording medium 70. A memory card 60 that is removable, and an embedded memory 62 that is incorporated in the video camera 101 can be used as the recording medium 70 for the controller 10. The controller 10 allows images based on new image data or the existing image data stored in the recording medium 70 to be displayed on the monitor 30. Hereinafter, the configuration of the video camera 101 will be described in detail.

The optical system 110 includes an objective lens 111, a zoom lens 112, an aperture 113, an OIS (Optical Image Stabilizer) 114 and a focus lens 115. The optical system 110 forms a subject image by collecting light from the subject.

The drive system 150 is constituted by a so-called servo system, which drives each optical element in the optical system 110.

The image pickup element 121 generates image data by picking up the subject image formed by the optical system 110. The image pickup element 121 is constituted, typically, of a CCD (Charge Coupled Device) image sensor or a CMOS (Complementary Metal Oxide Semiconductor) image sensor. The timing generator 122 generates a timing signal in order to drive the image pickup element 121. According to the timing signals generated by the timing generator 122, the image pickup element 121 takes various actions, such as exposure, transmission, and electronic shutter. The A/D converter 131 converts the image data generated by the image pickup element 121 into digital signals.

The image processing section 140 performs various processes on the image data converted by the A/D converter 131. Specifically, the image processing section 140 generates image data for recording on the recording medium 70, or generates image data for displaying on the monitor 30, by manipulating the image data generated by the image pickup element 121. Moreover, the image processing section 140 generates image data for displaying on the monitor 30, or generates image data for storing in the recording medium 70 again, by manipulating the existing image data read out from the recording medium 70. The image processing section 140 is constituted, generally, of DSP (Digital Signal Processor) or a micro computer.

A preprocessing section 141 performs various processes on the image data converted into digital signals by the A/D converter 131, such as gamma correction, white balance correction, and defect correction.

A compression section 142 compresses the image data using a known method, such as DCT (Discrete Cosine Transform), and Huffman coding. The compression section 142 compresses the image data using a compression format in compliance with a standard, such as MPEG-2 (Moving Picture Experts Group-2), and H.264.

A decompression section 143 decodes the image data into an uncompressed condition, in the case that the compressed image data stored in the recording medium 70 is reproduced on the monitor 30.

The controller 10 controls the entire video camera 101. The function to be provided by the controller 10 can be achieved by combining hardware, e.g. DSP, with software including a control program to be executed by the hardware.

The buffer 20 functions as a working memory for the controller 10 and the image processing section 140. The buffer 20 can be constituted, for example, of DRAM (Dynamic Random Access Memory) or a ferroelectric memory.

The controller 10 can access the memory card 60 inserted in a card slot 50, via the card slot 50. The memory card 60 is constituted of a nonvolatile memory, such as a flash memory and a ferroelectric memory. The embedded memory 62 can be constituted of a nonvolatile memory in the same manner as the memory card 60. Either one of the memory card 60 and the embedded memory 62 may be employed as the recording medium 70.

In this embodiment, the video camera 101 is provided with both the memory card 60 and the embedded memory 62 as the recording medium 70. However, such a configuration is not always necessary. For example, the video camera 101 may have a hard disk drive 64 (HDD) in addition to the recording medium 70. In this case, the memory card 60 and the hard disk drive 64 may be used suitably in combination. Further, it is also a conceivable configuration where image data is recorded on another recording medium, such as an optical disk, other than the memory card 60, the embedded memory 62 and the hard disk drive 64.

The monitor 30 can display images based on the new image data generated by the image generation unit 103, or images based on the existing image data stored in the recording medium 70. In addition, the monitor 30 can display various configuration information or recording duration of the video camera 101. Examples of the monitor 30 to be employed include a liquid crystal monitor, an electronic viewfinder and an organic EL (electroluminescence) monitor.

Figure 2:
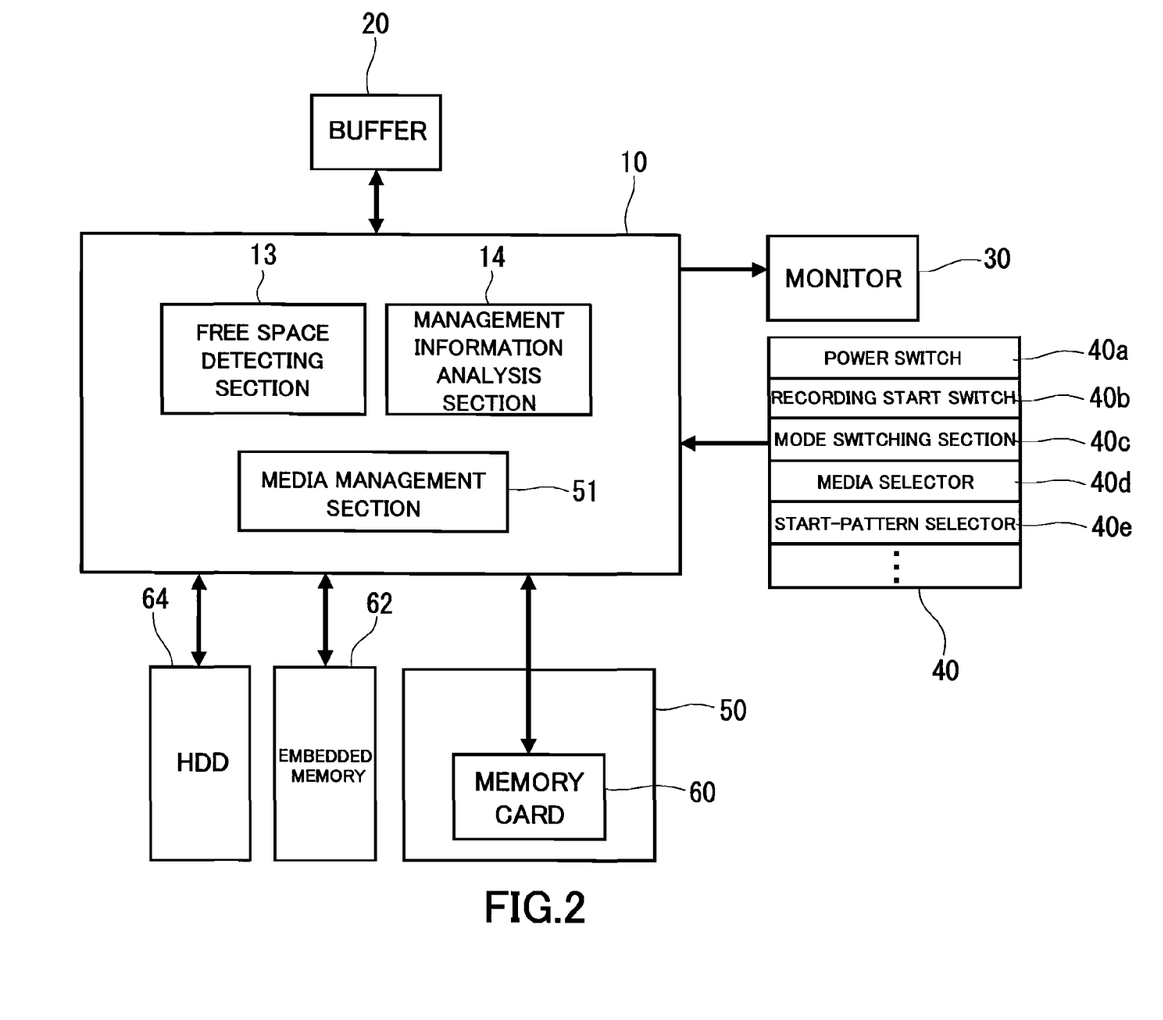
FIG. 2 is a block diagram indicating a part of the function of a controller.

The operation section 40 is a component collectively referring to various operational instruments, which serves to receive commands from a user, and transmit the commands to the controller 10. As shown in FIG. 2, the operation section 40 includes, for example, a power switch 40a, a recording start switch 40b, a mode switching section 40c, a media selector 40d and a start-pattern selector 40e. A part of the operation section 40 may be constituted of a touch screen using the monitor 30.

The mode switching section 40c is an operation section for switching between a recording mode in which new image data can be recorded on the recording medium 70 and a reproduction mode in which the existing image data can be read out from the recording medium 70. A user can select the operation mode of the video camera 101 by means of the mode switching section 40c. In the reproduction mode, the controller 10 can allow images based on the existing image data stored in the recording medium 70 to be displayed on the monitor 30 or an external receiver (e.g. a television receiver). Further, in the reproduction mode, the controller 10 can allow the image data in the recording medium 70 to be transferred to the hard disk drive 64 or an external storage device (e.g. a hard disk drive in a personal computer). In this case, the recording mode may be divided into a picture mode and a movie mode, or other operation modes may be provided. The mode switching section 40c may be constituted, for example, of a dial switch or a slide switch.

The media selector 40d is an operation section in which a user designates the recording destination of new image data. Specifically, a user can select, by means of the media selector 40d, whether to record new image data on the memory card 60, or on the embedded memory 62. In the case that the video camera 101 is provided with the hard disk drive 64, a user can select, by means of the media selector 40d, whether to record new image data on the recording medium 70, or on the hard disk drive 64. In addition, in the same manner as the case of recording new image data, the media selector 40d may be configured to allow a user to designate a read source of the existing image data.

In this embodiment, the memory card 60 and the embedded memory 62 are used in combination as the recording medium 70. The video camera 101 has a mode in which, at the time that recording of new image data on one medium becomes impossible, the recording destination of new image data is switched to another medium automatically (a so-called relay recording mode). Setting the relay recording mode allows a user to have a longer recording time.

The power switch 40a is a switch for starting the video camera 101. Upon operation of the power switch 40a to turn on the power source 22, the video camera 101 starts in the above-described recording mode or the reproduction mode. After the video camera 101 starts in the recording mode, actual recording is started by turning on the recording start switch 40b.

Specifically, when the power source 22 is turned on, the video camera 101 starts in an operation mode that has been set by the mode switching section 40c at the time of power-on. In this regard, it may be configured to start in an operation mode at the time of the last power-off, or start in the recording mode every time of power-on. Further, in this embodiment, the video camera 101 starts by receiving a user operation of the power switch 40a. However, such a configuration is not always necessary. For example, the video camera 101 may be configured to start by receiving a user operation of opening the monitor 30. Details of the start-pattern selector 40e will be described later.

FIG. 2 is a block diagram indicating a part of the function of the controller visually. The controller 10 includes a free space detecting section 13, a management information analysis section 14 and a media management section 51. The free space detecting section 13 functions to detect free space in the recording medium 70. The management information analysis section 14 has functions of obtaining recording management information that is necessary for recording new image data on the recording medium 70 and reproduction management information that is necessary for reproducing the existing image data, separately from the recording medium 70, and analyzing them. The media management section 51 serves to record new image data on the recording medium 70 and read out the existing image data stored in the recording medium 70. These functions can be achieved by providing a control program and a CPU (not shown in figures) in the controller 10 that executes the control program.

2. Operation 2-1. Start Operation

Figure 3A:
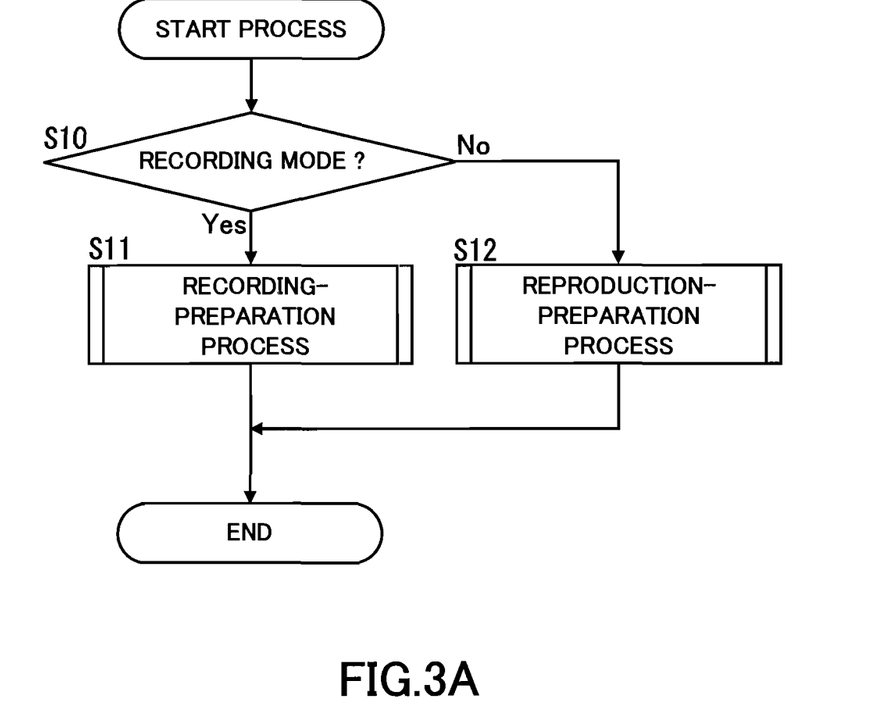
FIG. 3A is a flowchart of a start process.
Figure 3B:
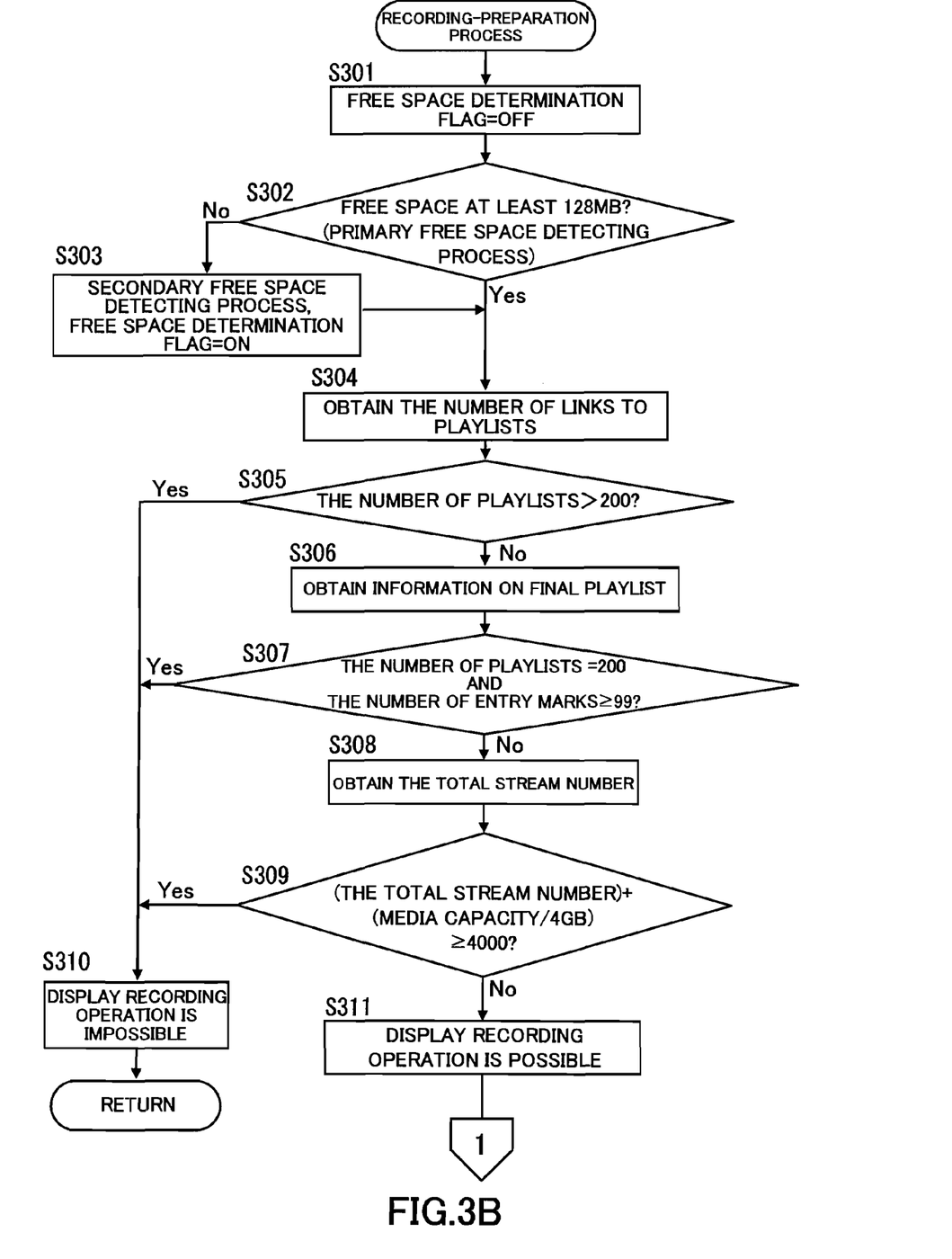
FIG. 3B is a detailed flowchart of a recording-preparation process in FIG. 3A.
Figure 3C:
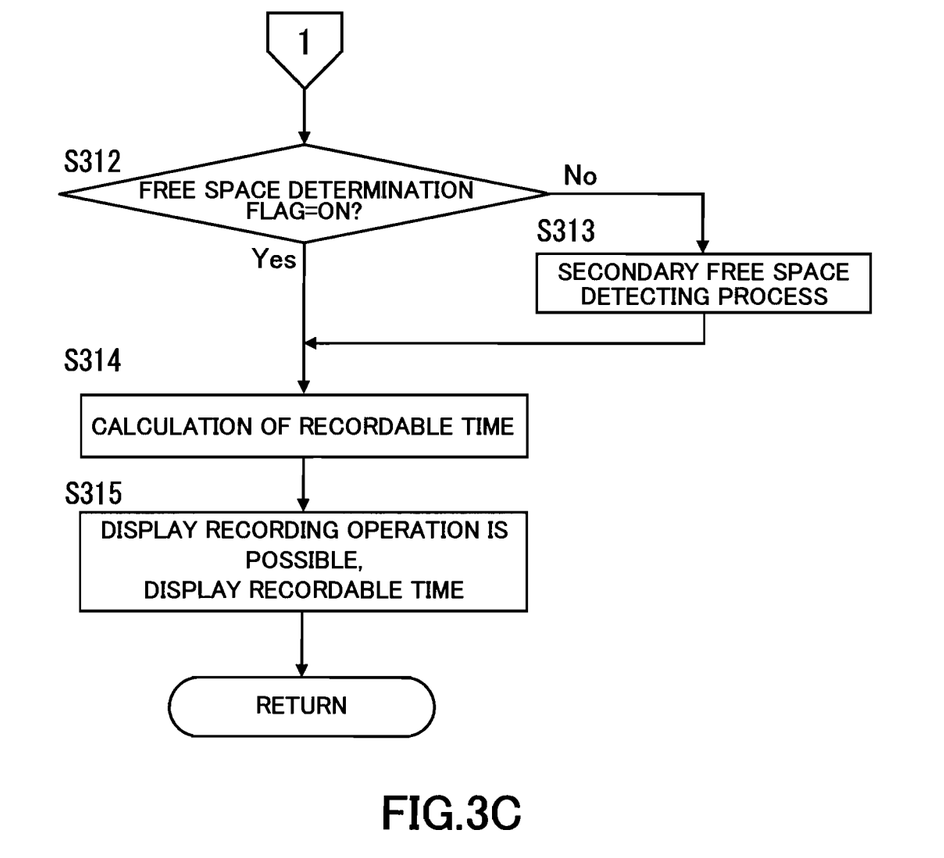
FIG. 3C is a continued flowchart of the recording-preparation process in FIG. 3B.

FIGS. 3A to 3C are flowcharts indicating a start operation process of the video camera 101. The controller 10 performs the start operation process shown in FIG. 3A in response to operation of turning on the power switch 40a.

First, upon receiving a user operation of turning on the power source 22, the controller 10 determines whether or not the current operation mode is set to a recording mode (S10). For example, the operation mode can be determined by providing a circuit that produces a different output (voltage level) depending on whether the mode switching section 40c is set to the recording mode or the reproduction mode, and by detecting the output of the circuit. If the recording mode is set, the controller 10 performs a recording-preparation process (S11). On the other hand, if this is not the case, the controller 10 performs a reproduction-preparation process (S12).

2-2. Start Operation in the Case of the Recording Mode

FIGS. 3B and 3C are detailed flowcharts of the recording-preparation process in FIG. 3A.

When the recording-preparation process is started, the free space detecting section 13 sets a free space determination flag off (S301). The free space determination flag herein means a flag for indicating whether or not the below-described secondary free space detecting process has been completed. If the free space determination flag is set to off, the free space detecting section 13 performs a primary free space detecting process in which presence or absence of free space with at least the predetermined capacity in the predetermined area of the recording medium 70 is checked (S302). In this embodiment, the predetermined capacity is set to 128 MB. If it is determined that the predetermined area does not have free space of 128 MB or more (S302), the free space detecting section 13 performs a secondary free space detecting process in which free space in an area other than the predetermined area is checked (S303). After detecting free space in the other area, the free space detecting section 13 sets the free space determination flag to on (S303).

Figure 4:
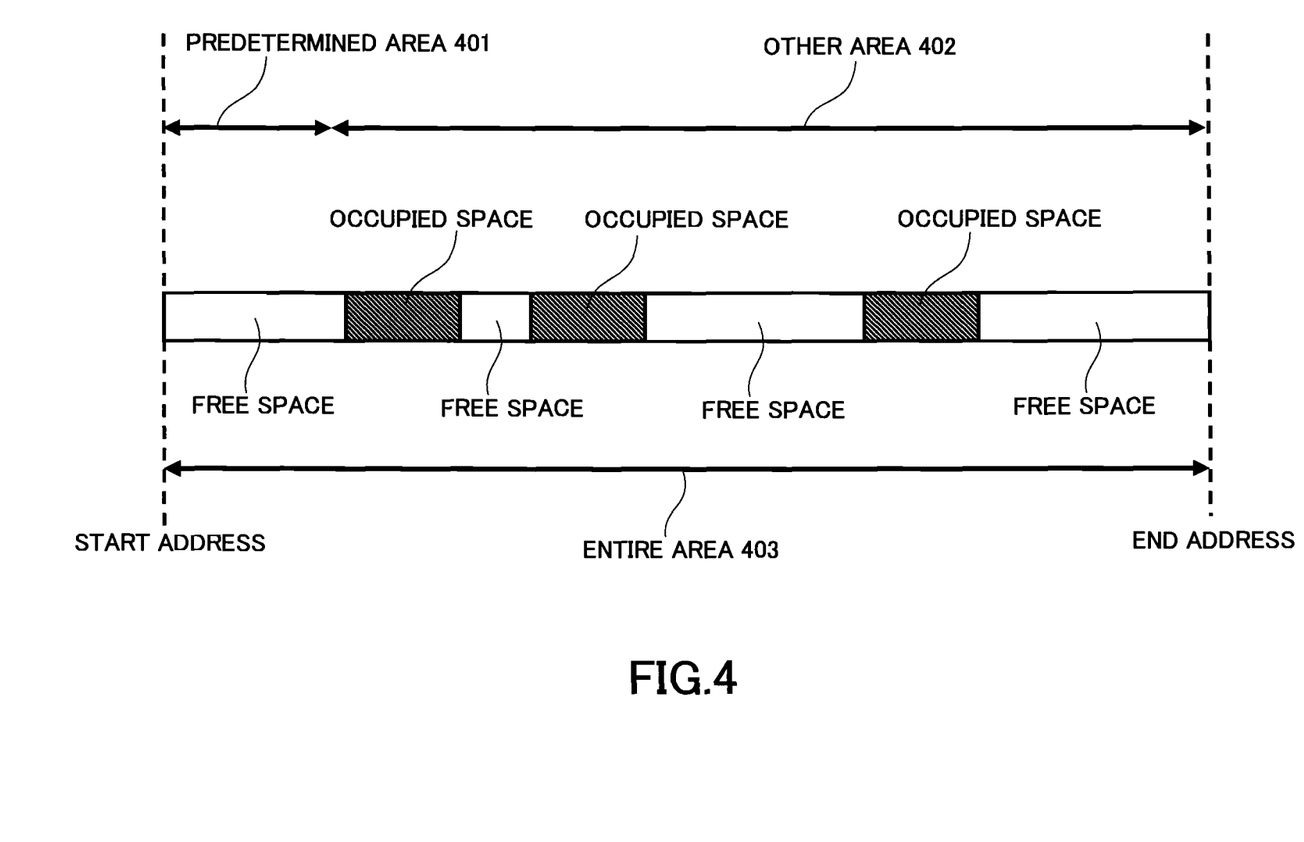
FIG. 4 is a schematic view indicating a method for calculating free space.

The primary and secondary free space detecting processes are described with reference to FIG. 4. As shown in FIG. 4, when performing the primary free space detecting process, the free space detecting section 13 calculates free space in the predetermined area 401 of the recording medium 70. The entire capacity of the recording medium 70 is extremely large (e.g. several ten GB or more), so that a thorough calculation of free space takes too much time. Therefore, in this embodiment, the free space detecting section 13 first calculates free space only in the predetermined area 401, and determines whether or not the calculated free space has at least the predetermined capacity (128 MB). Thus, whether or not free space in the predetermined area 401 has at least the predetermined capacity is checked. If the calculated free space has at least the predetermined capacity to ensure enough free space, the controller 10 proceeds to the process subsequent to S304 in the flowchart.

Calculation of free space in the recording medium 70 is one of the causes for taking a comparatively long time from power-on to the ready-to-record state. By calculating free space only in the predetermined area 401 first, and deferring the calculation of free space in other area 402, as described in this embodiment, the start time of the video camera 101 can be reduced considerably.

In the example shown in FIG. 4, an area from the start address of the recording medium 70 (the start address of available data area in the memory card 60 or the embedded memory 62) to several hundred MB is set as the predetermined area 401. The predetermined area 401 may be an area including the end address (the end address of available data area), or an intermediate area. Preferably, an area that is unlikely to be used, such as an area of several hundred MB from the end address, can be set as the predetermined area 401 to be checked in the primary free space detecting process. The predetermined area 401 is smaller than the other area 402 in size. The size of the predetermined area 401 is not specifically limited, but it may be slightly larger than the predetermined capacity (128 MB), so that time consumption in the primary free space detecting process can be suppressed to a minimum.

There also may be a case in which the area to be checked for presence or absence of free space with at least the predetermined capacity in the primary free space detecting process is not fixed. For example, in the primary free space detecting process, free space may be calculated for each of a plurality of virtual blocks in the recording medium 70. In this case, upon finding a block having free space with at least the predetermined capacity, the process proceeds to an analysis process of recording management information following to S304.

It should be noted that the predetermined capacity is set to 128 MB in this embodiment. This predetermined capacity is not specifically limited, but it is not preferable to be set too small. In this embodiment, the video camera 101 permits recording new image data without waiting for completion of the secondary free space detecting process, if a given condition is satisfied. If an appropriate size of the predetermined capacity is set, even in the case that free space in the other area 402 turns out to be zero as a result of the secondary free space detecting process, the video camera 101 can record the image data up to the time on the predetermined area 401. It is one of the measures for "the predetermined capacity" to be larger than the size of the new image data generated by the image generation unit 103 in the case of picking up a subject image during from permission of reception of recording start input to completion of the secondary free space detecting process. If there is free space of 128 MB or more, recording is possible about for one minute, supposing that the recording bit rate is, for example, 17 Mbps.

On the other hand, when performing the secondary free space detecting process, the free space detecting section 13 calculates free space in the other area 402 except for the predetermined area 401. The free space detecting section 13 can calculate the free space of the entire area 403, that is, the entire free space of the recording medium 70 from the total of the free space of the predetermined area 401 calculated in the primary free space detecting process and the free space of the other area 402 calculated in the secondary free space detecting process.

In S302 of FIG. 3B, if the free space detecting section 13 determines the presence of 128 MB or more of free space, or the process of S303 is performed, the management information analysis section 14 obtains management information in the recording medium 70, and analyzes it (S304 to S309). Such management information includes recording management information that is necessary for recording new image data on the recording medium 70, and reproduction management information that is necessary for reproducing the existing image data. When the power source 22 is turned on in the recording mode, the management information analysis section 14 obtains recording management information and analyzes it, as shown in S304 to S309 of FIG. 3B. Omission of analysis of reproduction management information allows the start time to be reduced considerably.

Generally, management information in need of analysis has a relationship to the standard or file system employed for the video camera 101. Examples of the standard that can be employed widely for imaging apparatuses, such as a video camera, include AVCHD (Advanced Video Codec High Definition™). AVCHD is one of the formats for recording high-definition movies, which is designed to be able to support a variety of media via a file system, such as FAT32 (File Allocation Table 32).

Figure 5:
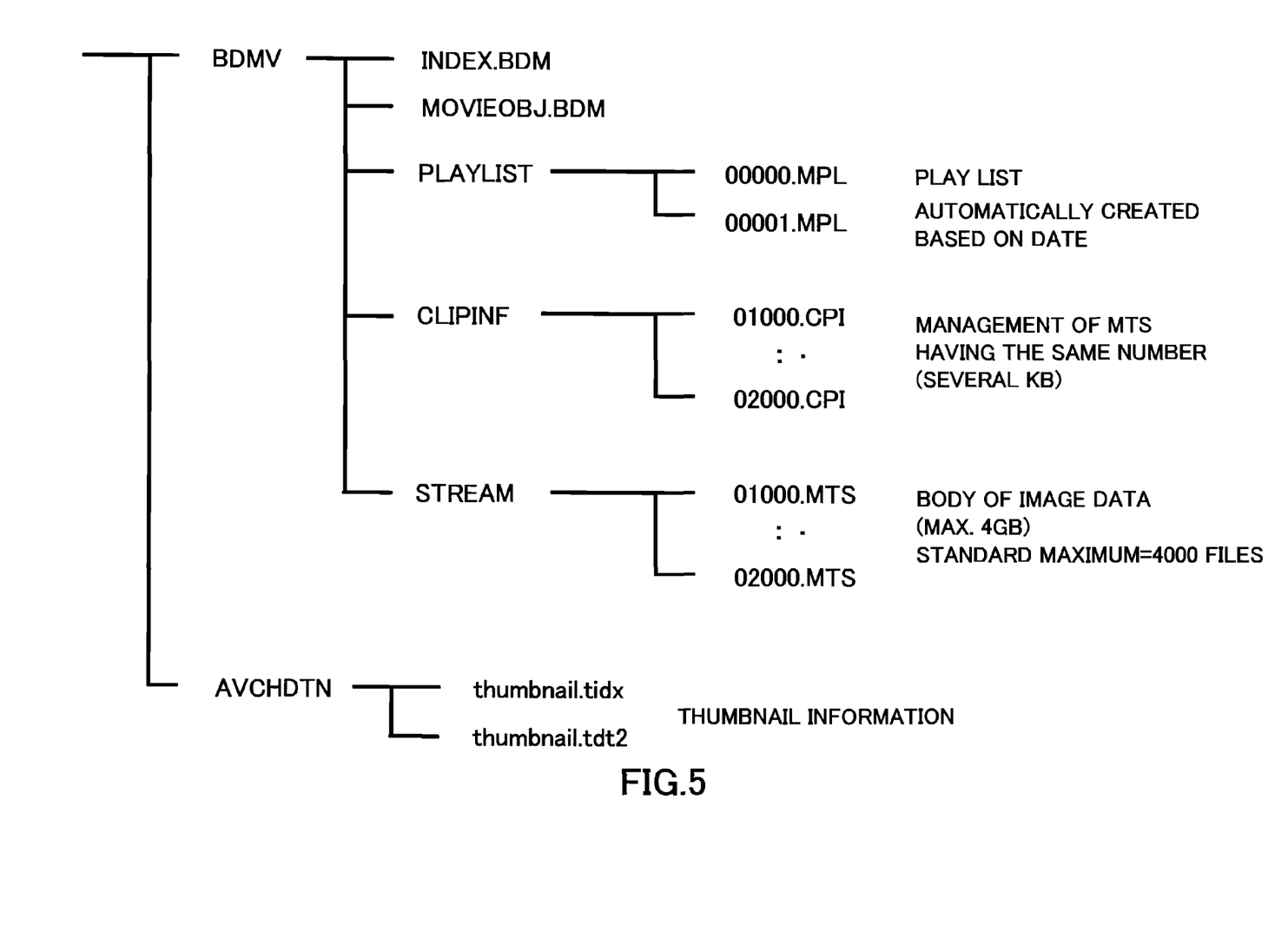
FIG. 5 is a schematic view indicating files stored in recording medium and the directory structure of the files.

In this embodiment, various files are stored in a directory structure shown in FIG. 5, based on AVCHD and FAT32. Each file or directory of "INDEX. BDM", "MOVIEOBJ. BDM", "PLAYLIST", "CLIPINF" and "STREAM" is stored in "BDMV" directory. Files including thumbnail information are stored in "AVCHDTN" directory.

Figure 6:
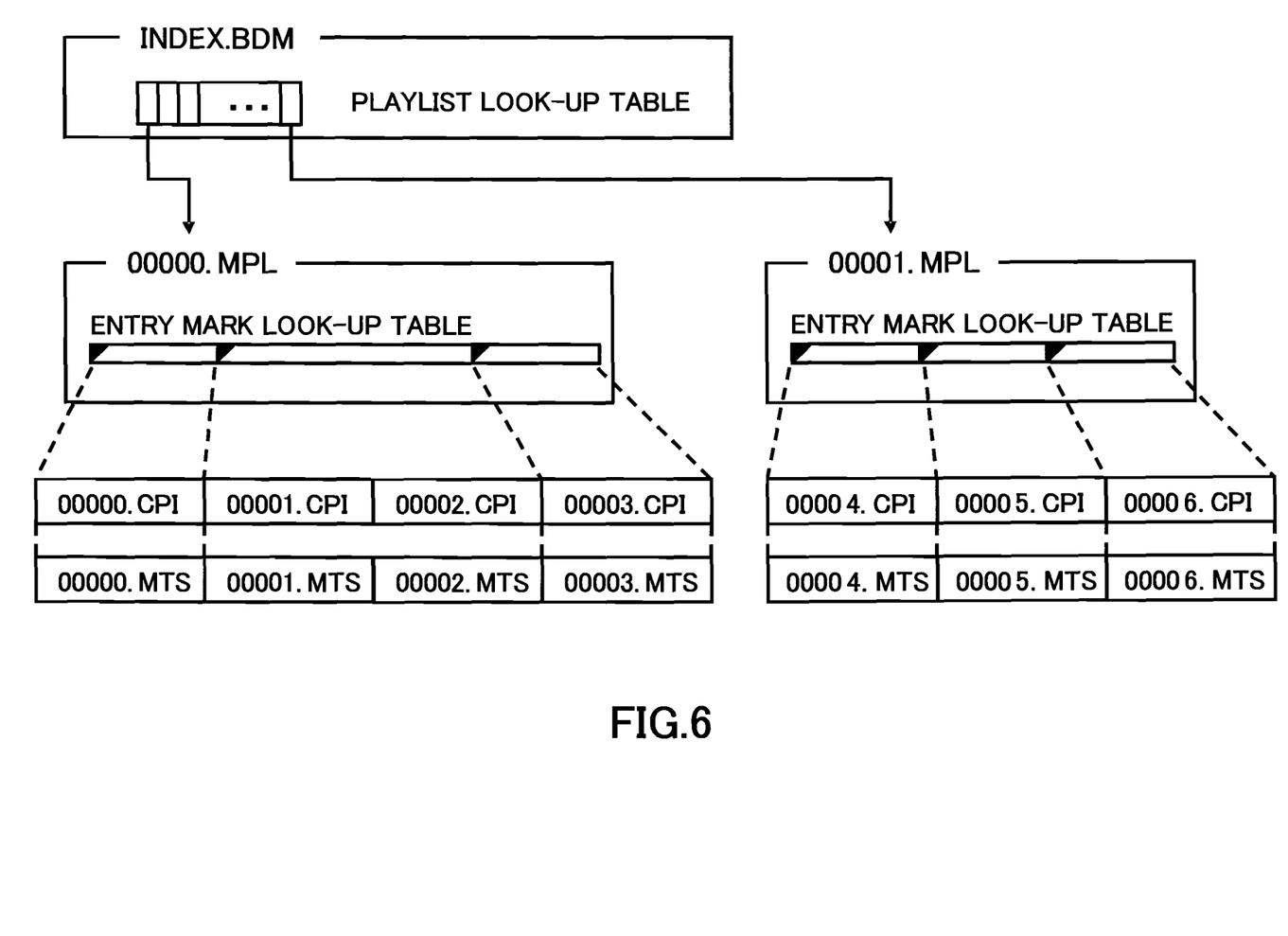
FIG. 6 is a schematic view indicating a structure of management information.

"INDEX. BDM" is a file that manages what kind of file is stored in the recording medium 70. INDEX. BDM file has a table (playlist look-up table) for reference of playlists related to movie files (image data) stored in the recording medium 70, as shown in FIG. 6.

A "playlist" herein is a file that groups one or a plurality of movie files based on an arbitrary rule, and manages them. In this embodiment, a playlist collectively manages all the movie files created on the same day. In this case, each playlist has information on the date of creation of each movie file. The date of creation of a specific movie file can be identified by reference to the playlist by which the specific movie file is managed.

"MOVIEOBJ. BDM" is a file that defines the reproduction method of movie files.

"PLAYLIST" directory stores the playlists having the file extension, "MPL".

"CLIPINF" directory stores management files (CPI files) having the file extension, "CPI". The CPI files are in one-to-one correspondence with movie files having the file extension, "MTS". The CPI file has information on the corresponding movie file (for example, information on the angle of view of moving images, information on the type of audio data in the movie file, or the like).

"STREAM" directory stores movie files (MTS files) having the extension, "MTS", that is, the body of image data.

In S302 of FIG. 3B, if the free space detecting section 13 determines the presence of 128 MB or more of free space, or the process of S303 is performed, the management information analysis section 14 obtains, from the playlist look-up table, information on the number of links to the playlists (i.e. the number of playlists) (S304). After obtaining information on the number of links to the playlists, the management information analysis section 14 determines whether or not the number of the playlists present in the recording medium 70 exceeds the predetermined maximum value (which is, in this embodiment, 200) (S305). This is because there may be a case where the number of the playlists that can be created on the recording medium 70 is limited, for example, by a standard.

If the number of the playlists is determined to exceed the predetermined maximum value (200) (S305), the controller 10 causes the monitor 30 to display an indication that recording operation is impossible (S310).

If the number of the playlists is determined to be 200 or less, the management information analysis section 14 obtains information on a playlist with the most recent date among the playlists stored in the playlist look-up table, that is, the final playlist (S306).

After obtaining information on the final playlist, the management information analysis section 14 determines whether or not the final playlist is the 200th playlist, and the number of entry marks in the final playlist exceeds a particular number (S307). The term "entry mark" herein means an electronic bookmark that allows a user to search for a specific scene easily in reproduction. As shown in FIG. 6, each playlist includes an entry mark look-up table that can specify the position or number of entry marks. The number of entry marks that can be managed in one playlist also has the predetermined maximum. In this embodiment, 99 entry marks can be managed in one playlist. The reason why the management information analysis section 14 performs the process of S307 is described below.

In this embodiment, the controller 10 creates a new playlist in the case that an image has a different shooting date. However, if the number of the playlists reaches 200, which is the maximum, the controller 10 adds the management information of the new image data to the 200th playlist without creating a new playlist even in the case that the image has a different shooting date. Accordingly, even if the number of the playlists already reaches 200, if the number of entry marks of the 200th playlist is still less than 99, the controller 10 can add the management information of the new image data to the 200th playlist. On the other hand, 200 playlists are already created, and 99 entry marks are created in the 200th playlist, the management information analysis section 14 determines that new image data cannot be recorded. In this case, the controller 10 causes the monitor 30 to display an indication that recording operation is impossible (S310).

If the determination is NO in S307, the management information analysis section 14 obtains information on the total number of the existing image data (the total stream number) (S308). In the case that new image data is recorded using the entire capacity of the recording medium 70, the management information analysis section 14 determines whether or not the total number of files storing the existing image data and files storing the recorded new image data exceeds the predetermined maximum number of files (4000), upon obtaining information on the total number of the existing image data (S309). That is, the management information analysis section 14 determines whether or not new image data can be recorded, based on the total number of the existing image data (movie files), the size limitation of image data that can be recorded continuously, the limitation of the number of image data that can be recorded on the recording medium 70, and the entire capacity of the recording medium 70 (S308 and S309). Specifically, the management information analysis section 14 determines, in S309, whether or not: (the total stream number)+(media capacity/4 GB)≧4000 (S309). The reason why the management information analysis section 14 performs the process of S309 is described below.

FAT32 file system has a limitation in that the maximum size of one file is to be less than 4 GB. Therefore, in the case that one piece of image data (movie file) exceeds 4 GB, the controller 10 automatically creates a new file in order to continue recording. Further, in this embodiment, the manageable maximum file number is set to 4000. Accordingly, the management information analysis section 14 determines, in S309, whether or not: (the total stream number)+(media capacity/4 GB)≧4000. In this manner, whether or not recording of new image data is possible can be determined based on the standard limitations, without calculating the actual free space in the recording medium 70. This is also effective in reducing the start time.

As described above, the management information analysis section 14 determines whether or not recording of new image data is possible using, as recording management information, (i) the number of the playlists for managing the existing image data stored in the recording medium 70, (ii) information on the last created playlist (final playlist), and (iii) the total number of the existing image data. As a result of this, a problem, such as a recording interruption during recording new image data due to standard limitations, can be prevented in advance.

In S304 to S309, the management information analysis section 14 obtains recording management information from the recording medium 70 in response to the operation of turning on the power source 22, and determines whether or not recording of new image data on the recording medium 70 is possible, based on analysis of the obtained recording management information. In other words, the management information analysis section 14 determines whether or not recording of new image data is possible, at the time of completion of analysis of the recording management information, regardless of whether analysis of reproduction management information is completed. If it is determined that recording is possible, the management information analysis section 14 permits reception of recording start input that allows the image generation unit 103 and the media management section 51 respectively to generate the new image data and record the new image data on the recording medium 70. Thus, it is possible to reduce the time (the start time) from power-on to the ready-to-record state.

Figure 7A:
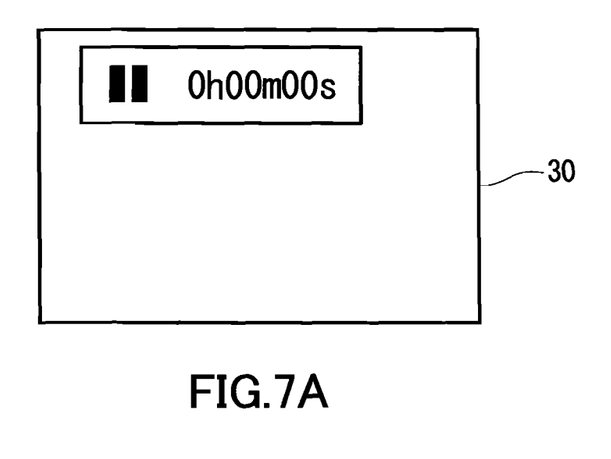
FIG. 7A is a display example of a monitor at the time that recording operation is enabled.

If the management information analysis section 14 permits reception of recording start input, the controller 10 causes the monitor 30 to display an indication that recording operation is possible. Specifically, the controller 10 causes the monitor 30 to display the recording time, thereby notifying a user that recording operation is possible, as shown in FIG. 7A. In this regard, other indications such as audio and lamp may be used to notify a user that recording operation is possible.

If the controller 10 causes the monitor 30 to display an indication that recording operation is possible, the free space detecting section 13 determines whether or not the entire free space of the recording medium 70 is detected, based on the free space determination flag as shown in FIG. 3C (S312). If the free space determination flag is off, the free space detecting section 13 calculates free space in the other area 402 shown in FIG. 4 (S313). That is, in response to the operation of turning on the power source 22, the free space detecting section 13 performs the primary free space detecting process (S301,S302) in which presence or absence of free space with at least the predetermined capacity in the recording medium 70 is checked, and the secondary free space detecting process (S313) in which free space is checked in an area other than the area that has been checked in the primary free space detecting process, in this order. If it is confirmed that free space with at least the predetermined capacity in the recording medium 70 is present as a result of the primary free space detecting process, and determined that recording new image data on the recording medium 70 is possible based on analysis of recording management information, the management information analysis section 14 permits reception of recording start input, regardless of whether the secondary free space detecting process is completed. More specifically, the reception of recording start input can be permitted at a time before completion of the secondary free space detecting process (at the time of S311).

Figure 7B:
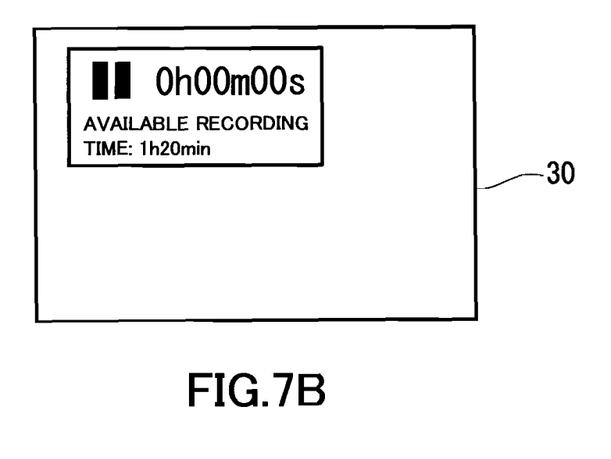
FIG. 7B is a display example of the monitor at the time that the total free space of recording medium is determined.

The entire free space in the recording medium 70 can be calculated from the total of the free space in the predetermined area 401 calculated in S301 and the free space in the other area 402 calculated in S313. By dividing the entire free space by a recording bit rate (e.g. 17 Mbit/sec), available recording time can be calculated (S314). Thereafter, as shown in FIG. 7B, the monitor 30 displays the available recording time (S315).

Thus, in this embodiment, the monitor 30 displays an indication that recording operation is possible at the time that the management information analysis section 14 permits the reception of recording start input. In addition, the monitor 30 displays available recording time based on the free space in the recording medium 70 calculated by the free space detecting section 13. Since the indications on the monitor 30 are displayed step-by-step, it is possible to notify a user quickly that recording has become possible without causing the user to feel discomfort.

It should be noted that, in this embodiment, new image data generated by the image generation unit 104 is stored temporarily in the buffer 20 before recorded on the recording medium 70. If the presence of free space in the other area 402 is confirmed as a result of the secondary free space detecting process, the media management section 51 records the new image data stored in the buffer 20, not on the predetermined area 401, but on the other area 402 (see FIG. 4). On the other hand, if the absence of free space in the other area 402 is confirmed as a result of the secondary free space detecting process, the media management section 51 records the new image data stored in the buffer 20 on the predetermined area 401. In this way, it is possible to ensure free space of 128 MB or more in the predetermined area 401 at any time. Because of this, there is no necessity for changing the predetermined area 401 that is to be checked in the primary free space detecting process.

Figure 7C:
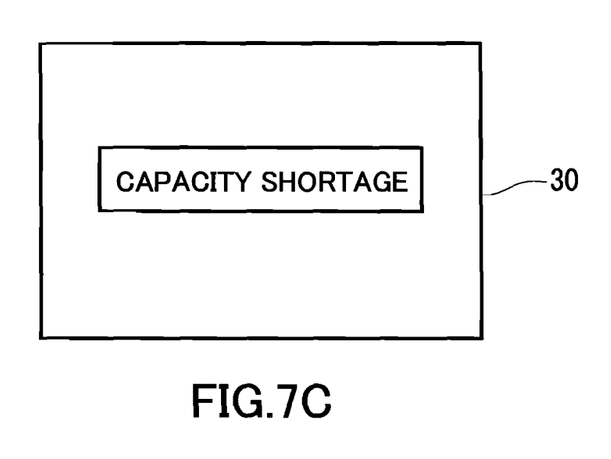
FIG. 7C is a display example of the monitor at the time that recording operation is disabled.

Further, in the case that it turns out that the remaining recording time is less than a particular time (e.g. for several minutes) as a result of calculating the entire free space in the recording medium 70, the monitor 30 may display an indication of capacity shortage, as shown in FIG. 7C.

As already described, a user can designate the recording destination of new image data by operating the media selector 40*d*. Accordingly, in response to the operation of turning on the power source 22, after checking the recording destination of new image data, the management information analysis section 14 may first obtain recording management information from either one of the memory card 60 or the embedded memory 62 on which new image data is to be recorded and analyze it. Thus, it is sufficient to check either medium of the memory card 60 and the embedded memory 62 for whether or not recording of new image data is possible, which is effective in reducing the start time.

Further, in the case that a mode is set in which, at the time that recording of new image data on one media is disabled, the recording destination of new image data is switched to the other media automatically (a so-called relay recording mode), the following process may be performed. The management information analysis section 14 first determines whether or not recording of new image data on the relay source media is possible. The relay source media means the media on which new image data is to be recorded first. If it is determined that recording new image data on the relay source media is possible, reception of recording start input is permitted. Thereafter, whether or not it is possible to record new image data on the relay destination media is checked. Further, free space in the relay source media is calculated beforehand, and the monitor 30 displays the available recording time. Then, free space in the relay destination media also is calculated, the monitor 30 displays the total available recording time. In this way, even in the case that the memory card 60 and the embedded memory 62 are used in combination, it can be ensured that the time from power-on to the ready-to-record state is reduced.

In addition, in the case that the relay recording mode is set, the following process also can be employed. First, if the absence of free space with at least the predetermined capacity in the relay source media is confirmed, whether or not free space in the relay destination media has at least the predetermined capacity is checked. If the relay destination media has free space with at least the predetermined capacity, recording management information is obtained from the relay destination media, and the obtained recording management information is analyzed. As a result, if it is determined that recording new image data on the relay destination media is possible, reception of recording start input is permitted. That is, the relay source media is switched forcedly with the relay destination media. In this way, as long as at least one media has free space with at least the predetermined capacity, quick start is possible.

In the case that the hard disk drive 64 is selected as a destination for recording new image data, another start pattern may be employed in which analyses of both recording management information and reproduction management information are performed by the management information analysis section 14 (below-described normal start pattern), instead of the start pattern where analysis of recording management information is performed beforehand to determine whether or not recording of new image data is possible. This is because the hard disk drive 64 requires time to make its motor rotation number stable, and the controller 10 can complete analyses of recording management information and reproduction management information before the motor rotation number of the hard disk drive 64 becomes stable.

2-3. Start Operation in the Case of the Reproduction Mode

Subsequently, the reproduction-preparation process (S12 in FIG. 3A) to be performed in the case that the operation mode of the video camera 101 is set to the reproduction mode is described. In response to power-on, the management information analysis section 14 refers to the current operation mode set by the mode switching section 40*c*. If the recording mode is set, recording management information is obtained and analyzed. On the other hand, if the reproduction mode is set, reproduction management information is obtained from the recording medium 70, the existing image data is prepared to be reproduced, based on analysis of the reproduction management information. At the time of reproduction, it is necessary for a user to be able to designate a specific scene among the image data to reproduce it. In order for this, detailed analysis of reproduction management information is necessary.

With reference to FIG. 6, the analysis process of reproduction management information is described. The management information analysis section 14 searches the entry mark look-up tables that constitute each playlist using the playlist look-up table in INDEX. BDM file. After that, the management information analysis section 14 searches an entry mark corresponding to each scene at the time of shooting in each entry mark look-up table.

The management information analysis section 14 obtains information on entry marks from all the playlists and saves it in the buffer 20. In other words, the management information analysis section 14 uses information included in all the existing playlists in the recording medium 70, specifically, the entry mark look-up tables included in the playlists, as reproduction management information. In this way, it is necessary for the management information analysis section 14 to analyze all the playlists, in the case that the reproduction mode is set at the time of start. Accordingly, the management information analysis section 14 takes a long time to obtain and analyze reproduction management information, compared to the time to obtain and analyze recording management information that is necessary for recording new image data. Therefore, it is of great significance that the recording-preparation process and the reproduction-preparation process are performed independently corresponding to the set operation mode, as described in this embodiment.

When a command to reproduce a specific scene is input from the operation section 40, the media management section 51 refers to the buffer 20, and specifies the image data that corresponds to the specific scene to read out the image data (MTS file shown in FIG. 5) from the recording medium 70. The read image data is displayed on the monitor 30 after processed by the image processing section 140.

Note that, in the case that the mode is switched from the recording mode to the reproduction mode, or vice versa, the management information analysis section 14 obtains and analyzes either of recording management information and reproduction management information, corresponding to the switched mode. In this way, it is not necessary to obtain and analyze reproduction management information in the recording mode, while not necessary to obtain and analyze recording management information in the reproduction mode.

Moreover, the present invention may be applied, not only at the time of power-on or switching the operation mode, but also at the time of performing a recording-preparation process and a reproduction-preparation process after replacement of the memory card 60.

In addition, the start-pattern selector 40e for selecting a quick start pattern or a normal start pattern may be included in the operation section 40. The quick start pattern is a start pattern in which, in the case that the operation mode is the recording mode, the process of FIGS. 3B and 3C is performed upon power-on. The normal start pattern is a start pattern in which, regardless of the operation mode, free space in the recording medium 70 is checked, and analyses of recording management information and reproduction management information are performed. In the quick start pattern, since reduction of the start time is considered to be important, the magnification or the like of the optical system 110 may be forcedly set to a default. On the other hand, in the normal start pattern, the magnification or the like of the optical system 110 is set to one at the time of the last power-off. This can respond not only to users who desire quick start, but also to users who desire to keep the setting at the time of power-off.

In the case that the hard disk drive 64 is selected as a destination for recording new image data, the normal start pattern may be set forcedly at the time of start.

Further, there may be a case where the mode switching section 40c is operated so that the operation mode is switched from the recording mode to the reproduction mode in the middle of performing the process of S301 to S315 in FIGS. 3B and 3C. In this case, as soon as whether or not recording of new image data is possible is determined (at the time of S311) or calculation of the entire free space is completed (at the time of S314), the process can move on to the reproduction-preparation process. In the case that a mode is selected in which new image data is recorded on a plurality of media in order (the relay recording mode), the process may move on to the reproduction-preparation process, at the time of completion of calculation of the free space in the first media.

Modified Embodiment 1

According to the recording-preparation process shown in FIGS. 3B and 3C, the secondary free space detecting process is performed before or after (S303 and S313) the analysis process of recording management information (S304 to S309). However, the secondary free space detecting process can be performed concurrently with the analysis process of recording management information. Specifically, if the presence of free space with at least the predetermined capacity in the predetermined area 401 is confirmed as a result of the primary free space detecting process of S302, the free space detecting section 13 performs the secondary free space detecting process in the background of the analysis process (S304 to S309) of recording management information by the management information analysis section 14.

As shown in S304 to S309 of FIG. 3B, the management information analysis section 14 alternately obtains and analyzes recording management information from the recording medium 70. There may be a case in which the management information analysis section 14 takes a comparatively long time to analyze recording management information, although the access time to the recording medium 70 is substantially short. In this case, by making use of the time period during which the management information analysis section 14 does not access the recording medium 70, the secondary free space detecting process can be performed. Access to the recording medium 70 via a CPU (not shown in figures) in the controller 10 cannot be permitted, because the CPU is used by the management information analysis section 14. However, use of a direct memory access controller (not shown in figures) makes it possible to perform the secondary free space detecting process in the background of the analysis process of recording management information. The direct memory access controller may be constituted of a hardware provided in the controller 10.

Figure 8:
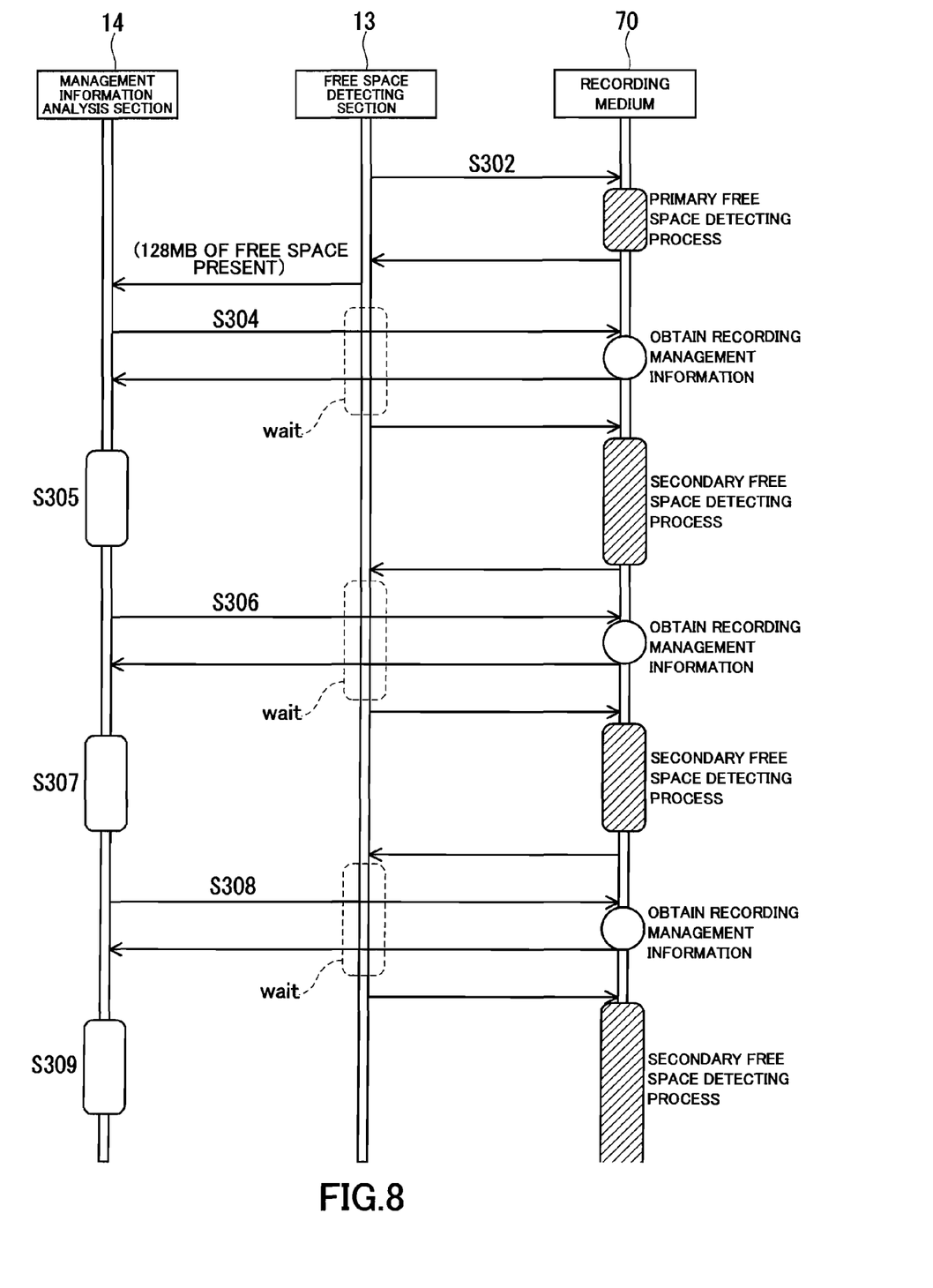
FIG. 8 is a schematic view indicating task switching in the case of performing a secondary free space detection process in the background.

As shown in FIG. 8, tasks are switched between the free space detecting section 13 and the management information analysis section 14 so that the free space detecting section 13 is placed into a standby condition temporarily in the time period (S304, S306 and S308) during which the management information analysis section 14 is necessary to access the recording medium 70. The free space detecting section 13 performs the secondary free space detecting process, by accessing the recording medium 70 via the direct memory access controller, while the management information analysis section 14 analyzes recording management information (S305, S307 and S309). When it becomes necessary for the management information analysis section 14 to newly-obtain recording management information from the recording medium 70, the secondary free space detecting process is suspended so that access right to the recording medium 70 is transferred from the free space detecting section 13 to the management information analysis section 14. The information on free space already checked by the free space detecting section 13 is saved in the buffer 20 point by point. In this way, not only the start time can be reduced, but also free space in the recording medium 70 can be determined more quickly, allowing the monitor 30 to display it. As a result, a user is free from stress.

The present invention is useful for imaging apparatuses, such as a digital still camera and a digital video camera.

The present invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An imaging apparatus comprising:
a power source that supplies power to the apparatus;
an image generation unit that generates new image data based on a subject image;

a media management section that serves to record the new image data on a recording medium, and to read out existing image data stored in the recording medium; and a management information analysis section that separately obtains, from the recording medium, a reproduction management information that is necessary for reproducing the existing image data and a recording management information that is necessary for recording the new image data on the recording medium and that has a quantity of information smaller than a quantity of information of the reproduction management information, that analyzes each information, wherein when the power source is turned on, the management information analysis section is configured to determine, based on the analysis result of the recording management information, whether or not to permit reception of recording start input that allows the image generation unit and the media management section respectively to generate the new image data and record the new image data on the recording medium, regardless of whether or not analysis of the reproduction management information is completed, at the time of completion of analysis of the recording management information; and the management information analysis section uses, as the recording management information, the number of playlists for managing the existing image data, information included in the last created playlist and the total number of the existing image data, and uses, as the reproduction management information, information included in all the playlists.

2. The imaging apparatus according to claim 1, further comprising:

a mode switching section that switches between a recording mode in which the new image data can be recorded on the recording medium and a reproduction mode in which the existing image data can be read out from the recording medium, wherein the management information analysis section obtains and analyzes the recording management information, when the power source is turned on with the recording mode being set, and the management information analysis section obtains the reproduction management information from the recording medium and prepares for reproduction of the existing image data based on analysis of the obtained reproduction management information, when the power source is turned on with the reproduction mode being set.

3. The imaging apparatus according to claim 2, wherein, in the case that mode switching from the recording mode to the reproduction mode, or vice versa, is performed, the management information analysis section obtains and analyzes either of the recording management information and the reproduction management information, corresponding to the switched mode.

4. The imaging apparatus according to claim 1, further comprising:

a monitor that displays an indication that recording operation is possible when the management information analysis section permits reception of the recording start input.

5. The imaging apparatus according to claim 1, wherein the management information analysis section determines whether or not recording of the new image data is possible, based on the total number of the existing image data, a size limitation of image data that can be recorded continuously, a limitation of the number of image data that can be recorded on the recording medium, and the entire capacity of the recording medium.

6. The imaging apparatus according to claim 1, further comprising:

a free space detecting section configured to perform a primary free space detecting process in which presence or absence of free space with at least the predetermined capacity in the recording medium is checked and a secondary free space detecting process in which free space in an area other than the area that has been checked in the primary free space detecting process is checked in this order, in response to operation of turning on the power source, wherein when it is confirmed that free space with at least the predetermined capacity in the recording medium is present as a result of the primary free space detecting process, and determined that recording the new image data on the recording medium is possible based on analysis of the recording management information, the management information analysis section permits reception of the recording start input, regardless of whether the secondary free space detecting process is completed.

7. The imaging apparatus according to claim 6, wherein when the presence of free space with at least the predetermined capacity in the recording medium is confirmed as a result of the primary free space detecting process, the free space detecting section performs the secondary free space detecting process in the background of the analysis process of the recording management information by the management information analysis section.

8. The imaging apparatus according to claim 7, wherein the free space detecting section performs the secondary free space detecting process, by accessing the recording medium via a direct memory access controller, while the management information analysis section analyzes the recording management information, and the secondary free space detecting process is suspended so that access right to the recording medium is transferred from the free space detecting section to the management information analysis section, when it becomes necessary for the management information analysis section to newly-obtain the recording management information from the recording medium.

9. The imaging apparatus according to claim 6, wherein the predetermined capacity is larger than the size of the new image data generated by the image generation unit in the case of picking up the subject image during from permission of reception of the recording start input to completion of the secondary free space detecting process.

10. The imaging apparatus according to claim 6, wherein the free space detecting section checks presence or absence of free space with at least the predetermined capacity in a predetermined area of the recording medium in the primary free space detecting process.

11. The imaging apparatus according to claim 10, wherein the free space detecting section calculates free space in the predetermined area and determines whether or not the calculated free space has at least the predetermined capacity in the primary free space detecting process, while the free space detecting section calculates free space in an area other than the predetermined area in the secondary free space detecting process.

12. The imaging apparatus according to claim 11, further comprising:

a buffer that temporarily stores the new image data generated by the image generation unit before recording of the new image data on the recording medium, wherein when the presence of free space in the other area is confirmed as a result of the secondary free space detecting process, the media management section records the new image data stored in the buffer on the other area, and when the absence of free space in the other area is confirmed as a result of the secondary free space detecting process, the media management section records the new image data stored in the buffer on the predetermined area.

13. The imaging apparatus according to claim 6, further comprising:

a monitor that displays an indication that recording operation is possible at the time that the management information analysis section permits reception of the recording start input as well as displays available recording time based on the free space in the recording medium calculated by the free space detecting section.

14. The imaging apparatus according to claim 1, wherein the recording medium includes a removable nonvolatile memory card and an embedded nonvolatile memory that is integrated in the imaging apparatus, the imaging apparatus is provided with a media selector that allows a user to select whether to record the new image data on the memory card or the embedded memory, and in response to operation of turning on the power source, the management information analysis section first obtain recording management information from either one of the memory card or the embedded memory on which the new image data is to be recorded and analyze the recording management information.

15. The imaging apparatus according to claim 1, further comprising:

a hard disk drive; and a media selector that allows a user to select whether to record the new image data on the recording medium or on the hard disk drive, wherein in the case that the hard disk drive is selected as a destination for recording the new image data, the management information analysis section analyzes both of the recording management information and the reproduction management information, instead of a start pattern where the management information analysis section analyzes the recording management information beforehand to determine whether or not recording of the new image data is possible.

16. A method of starting an imaging apparatus, the method comprising:

permitting recording of new image data on a recording medium or reproduction of an existing image data on the recording medium based on a reproduction management information, that is necessary for reproducing the existing image data, and a recording management information, that is necessary for recording the new image data on the recording medium and that has a quantity of information smaller than a quantity of information of the reproduction management information, that are separately obtained and analyzed;

determining whether or not recording of the new image data on the recording medium is possible, when a power source of the imaging apparatus is turned on, regardless of whether or not analysis of the reproduction management information is completed, at the time of completion of analysis of the recording management information, based on the analysis result of the recording management information; and permitting reception of recording start input that allows the image generation unit of the imaging apparatus and the media management section respectively to generate the new image data and record the new image data on the recording medium, when it is determined that recording the new image on the recording medium is possible; and the management information analysis section using, as the recording management information, the number of playlists for managing the existing image data, information included in the last created playlist and the total number of the existing image data, and using, as the reproduction management information, information included in all the playlists.

17. The imaging apparatus according to claim 1, wherein the analysis of the reproduction management information takes more time than the analysis of the recording management information.

18. The method according to claim 16, further comprising the analysis of the reproduction management information taking more time than the analysis of the recording management information.

* * * * *